(12) United States Patent
Li et al.

(10) Patent No.: US 11,527,907 B2
(45) Date of Patent: Dec. 13, 2022

(54) HIGH VOLTAGE HYBRID CHARGING SYSTEM AND METHOD

(71) Applicant: NuVolta Technologies (Hefei) Co., Ltd., Hefei (CN)

(72) Inventors: Zeng Li, Shanghai (CN); Junxiao Chen, Shanghai (CN); Fengyu He, Shanghai (CN)

(73) Assignee: NuVolta Technologies (Hefei) Co., Ltd., Hefei (CN)

(*) Notice: Subject to any disclaimer, the term of this patent is extended or adjusted under 35 U.S.C. 154(b) by 0 days.

(21) Appl. No.: 17/387,022

(22) Filed: Jul. 28, 2021

(65) Prior Publication Data

US 2021/0359552 A1    Nov. 18, 2021

Related U.S. Application Data

(63) Continuation of application No. 16/432,410, filed on Jun. 5, 2019.

(30) Foreign Application Priority Data

May 10, 2019   (CN) .......................... 201910390717.4

(51) Int. Cl.
*H02J 7/02*    (2016.01)
*H02J 50/12*   (2016.01)
*H02J 7/00*    (2006.01)

(52) U.S. Cl.
CPC ............ *H02J 7/025* (2013.01); *H02J 7/0063* (2013.01); *H02J 50/12* (2016.02)

(58) Field of Classification Search
CPC .......... H02J 7/025; H02J 50/12; H02J 7/0063
See application file for complete search history.

(56) References Cited

U.S. PATENT DOCUMENTS

| | | |
|---|---|---|
| 2014/0300312 A1 | 10/2014 | Akiyoshi et al. |
| 2016/0094080 A1 | 3/2016 | Dong |
| 2018/0287405 A1 | 10/2018 | Govindaraj et al. |
| 2019/0341796 A1 | 11/2019 | Gu et al. |

FOREIGN PATENT DOCUMENTS

CN    108233455 A    6/2018

*Primary Examiner* — Carlos Amaya
(74) *Attorney, Agent, or Firm* — Slater Matsil, LLP (57) ABSTRACT

A method includes configuring a high voltage charging system to operate in a wireless charging mode to charge a battery after a power source has been disconnected from the high voltage charging system, wherein the high voltage charging system comprises a rectifier, a first power converter, a second power converter connected in cascade, and a load switch connected between a voltage bus and a power port configured to be connected to the power source, and configuring the high voltage charging system to operate in a wired charging mode to charge the battery after the power source has been connected to the high voltage charging system.

20 Claims, 9 Drawing Sheets

HIGH VOLTAGE HYBRID CHARGING SYSTEM AND METHOD

PRIORITY CLAIM

This application is a continuation of U.S. patent application Ser. No. 16/432,410, filed on Jun. 5, 2019, which claims priority to Chinese Patent Application No. 201910390717.4, filed on May 10, 2019, which is hereby incorporated by reference in its entirety.

TECHNICAL FIELD

The present invention relates to a charging system, and, in particular embodiments, to a high voltage hybrid charging system comprising a wireless power transfer path and a wired power transfer path.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As the power of the wireless power transfer system goes higher, there may be a need for achieving a high power wireless power transfer between the transmitter and the receiver. However, for a high power wireless power transfer system, the risk of high current induced overheating has become a significant issue, which presents challenges to the system design of the wireless power transfer system.

It would be desirable to have a high voltage charging system so as to reduce the current flowing through the receiver coil, thereby preventing high current induced heating from damaging the components of the receiver. As a result of having a lower current flowing through the receiver, the long term reliability can be improved.

SUMMARY

These and other problems are generally solved or circumvented, and technical advantages are generally achieved, by preferred embodiments of the present disclosure which provide a high voltage hybrid charging system.

In accordance with an embodiment, a method comprises configuring a high voltage charging system to operate in a wireless charging mode to charge a battery after a power source has been disconnected from the high voltage charging system, wherein the high voltage charging system comprises a rectifier, a first power converter, a second power converter connected in cascade, and a load switch connected between a voltage bus and a power port configured to be connected to the power source, and configuring the high voltage charging system to operate in a wired charging mode to charge the battery after the power source has been connected to the high voltage charging system.

In accordance with another embodiment, a method comprises configuring a high voltage charging system to leave a wired charging mode and enter into a wireless charging mode after a power source has been disconnected from the high voltage charging system, wherein the power source is coupled to a voltage bus of the high voltage charging system through a cable and a load switch, and the high voltage charging system comprises a rectifier, a first power converter, a second power converter connected in cascade, and configuring the high voltage charging system to leave the wireless charge mode and enter into the wired charging mode after the power source has been connected to the high voltage charging system.

In accordance with yet another embodiment, a method comprises configuring a high voltage charging system to have transitions between a wired charging mode and a wireless charging mode, wherein a power source is configured to be coupled to a voltage bus of the high voltage charging system through a cable and a load switch, and the high voltage charging system comprises a rectifier, a first power converter, a second power converter connected in cascade.

An advantage of an embodiment of the present disclosure is a high voltage hybrid charging system capable of efficiently charging a battery.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high voltage hybrid charging system. The disclosure may also be applied, however, to a variety of power systems. Hereinafter, various embodiments will be explained in detail with reference to the accompanying drawings.

Figure 1:
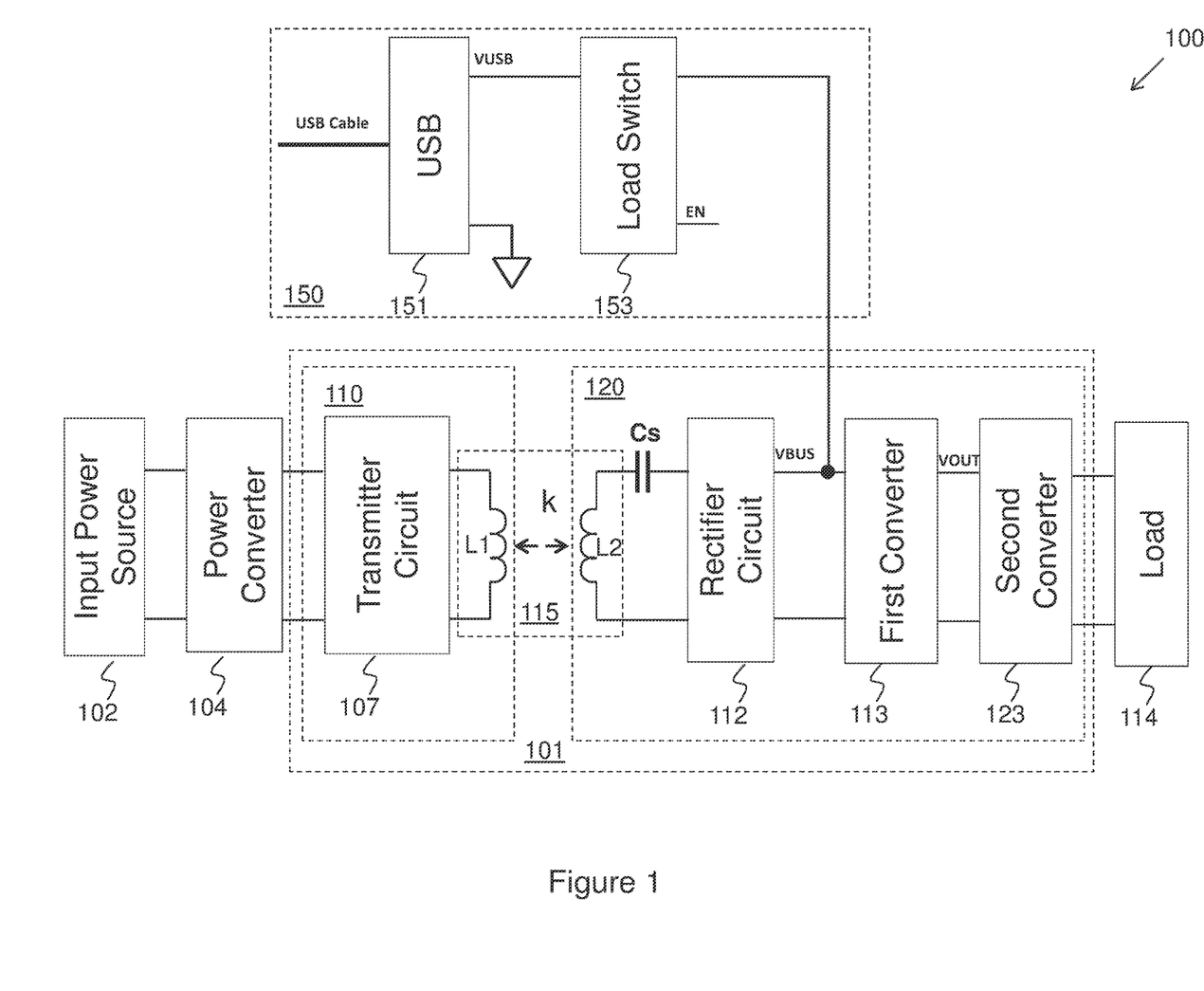
FIG. 1 illustrates a block diagram of a hybrid charging system in accordance with various embodiments of the present disclosure.

FIG. 1 illustrates a block diagram of a hybrid charging system in accordance with various embodiments of the present disclosure. The hybrid charging system 100 comprises a wireless power transfer path and a wired power transfer path. As shown in FIG. 1, the wireless power transfer path comprises a power converter 104 and a wireless power transfer device 101 connected in cascade between an input power source 102 and a load 114. In some embodiments, the power converter 104 is employed to further improve the performance of the hybrid charging system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier circuit 112, a first power converter 113 and a second power converter 123 connected in cascade. As shown in FIG. 1, the resonant capacitor Cs is connected in series with the receiver coil L2 and further connected to the inputs of the rectifier circuit 112. The outputs of the rectifier circuit 112 are connected to the inputs of the first power converter 113. The outputs of the first power converter 113 are connected to the inputs of the second power converter 123. The outputs of the second power converter 123 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier circuit 112. The power receiver 120 may comprise a secondary resonant capacitor Cs as shown in FIG. 1. Throughout the description, the secondary resonant capacitor Cs may be alternatively referred to as a receiver resonant capacitor.

The rectifier circuit 112 converts an alternating polarity waveform received from the output of the receiver coil L2 to a single polarity waveform. In some embodiments, the rectifier circuit 112 comprises a full-wave diode bridge, an output capacitor and a switch (e.g., a load switch). In alternative embodiments, the full-wave diode bridge may be replaced by a full-wave bridge formed by switching elements such as n-type metal oxide semiconductor (NMOS) transistors.

Furthermore, the rectifier circuit 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier circuit 112 are well known in the art, and hence are not discussed herein.

The first power converter 113 and the second power converter 123 are coupled between the rectifier circuit 112 and the load 114. The first power converter 113 and the second power converter 123 are non-isolated power converters connected in cascade. In some embodiments, the first power converter 113 is implemented as a hybrid power converter configured to operate in different modes for efficiently charging the load 114. The second power converter 123 is implemented as a charge pump power converter configured as a voltage divider. In alternative embodiments, both the first power converter 113 and the second power converter 123 are implemented as charge pump power converters configured as voltage dividers respectively.

In some embodiments, the input voltage of the first power converter 113 is two times as much as the input voltage of the second power converter 123. The input voltage of the second power converter 123 is two times as much as the voltage applied to the load 114 (e.g., a battery). In other words, the voltage at the voltage bus VBUS is four times as much as the voltage applied to the load 114. Such a high bus voltage helps to reduce the current flowing through the receiver coil L2. In some embodiments, the voltage at the voltage bus VBUS is in a range from about 5 V to about 20 V. Furthermore, the resolution of the voltage regulation of VBUS is equal to or less than about 200 mV.

One advantageous feature of having the first power converter 113 and the second power converter 123 is that a higher output voltage (e.g., 20 V) can be achieved at the output of the rectifier circuit 112 (VBUS in FIG. 1). Such a higher output voltage helps to lower down the current flowing through the receiver coil L2, thereby improving the efficiency of the power receiver 120.

The wired power transfer path of the hybrid charging system 100 comprises a universal serial bus (USB) port 151, a load switch apparatus 153, the first power converter 113 and the second power converter 123. The USB port 151 has an input configured to be connected with a USB cable and an output connected to the input of the load switch apparatus 153. The output of the load switch apparatus 153 is connected to the voltage bus VBUS. As shown in FIG. 1, both the wireless power transfer path and the wired power transfer path include the first power converter 113 and the second power converter 123.

In some embodiments, the USB port 151 may be a USB Type-A receptacle. The USB Type-A receptacle has a flat rectangular form factor. The USB Type-A receptacle is employed to accept a USB Type-A plug (e.g., a USB cable). In some embodiments, the USB Type-A receptacle is implemented as a four-pin connector. Two pins are used to provide the dc voltage supplied by the USB Type-A plug. The other two pins are used to transfer data. In alternative embodiments, the USB port 151 may be implemented as any suitable USB receptacles such as USB Type-B receptacles, USB mini receptacles, USB micro receptacles, USB Type-C receptacles and the like.

The load switch apparatus 153 may be implemented as two back-to-back connected transistors. The load switch apparatus 153 can be controlled such that the load switch apparatus 153 is either in an open state or a closed state. When load switch apparatus 153 is closed, the power is delivered from the USB port 151 to the load 114 through the first power converter 113 and the second power converter 123. When load switch apparatus 153 is open, the power deliver path between the USB port 151 and the load 114 is shut off or disabled.

It should be noted that the load switch apparatus 153 may function as an over-voltage protection apparatus. As shown in FIG. 1, the load switch apparatus 153 includes an enable pin EN. The enable pin may be used to turn off the load switch apparatus 153 in response to a fault. For example, in operation, when an over-voltage occurs, the load switch apparatus 153 may be turned off through the enable pin EN. The turned-off load switch apparatus 153 may help to isolate the hybrid charging system 100 from the over-voltage event, thereby protecting the hybrid charging system 100.

Figure 2:
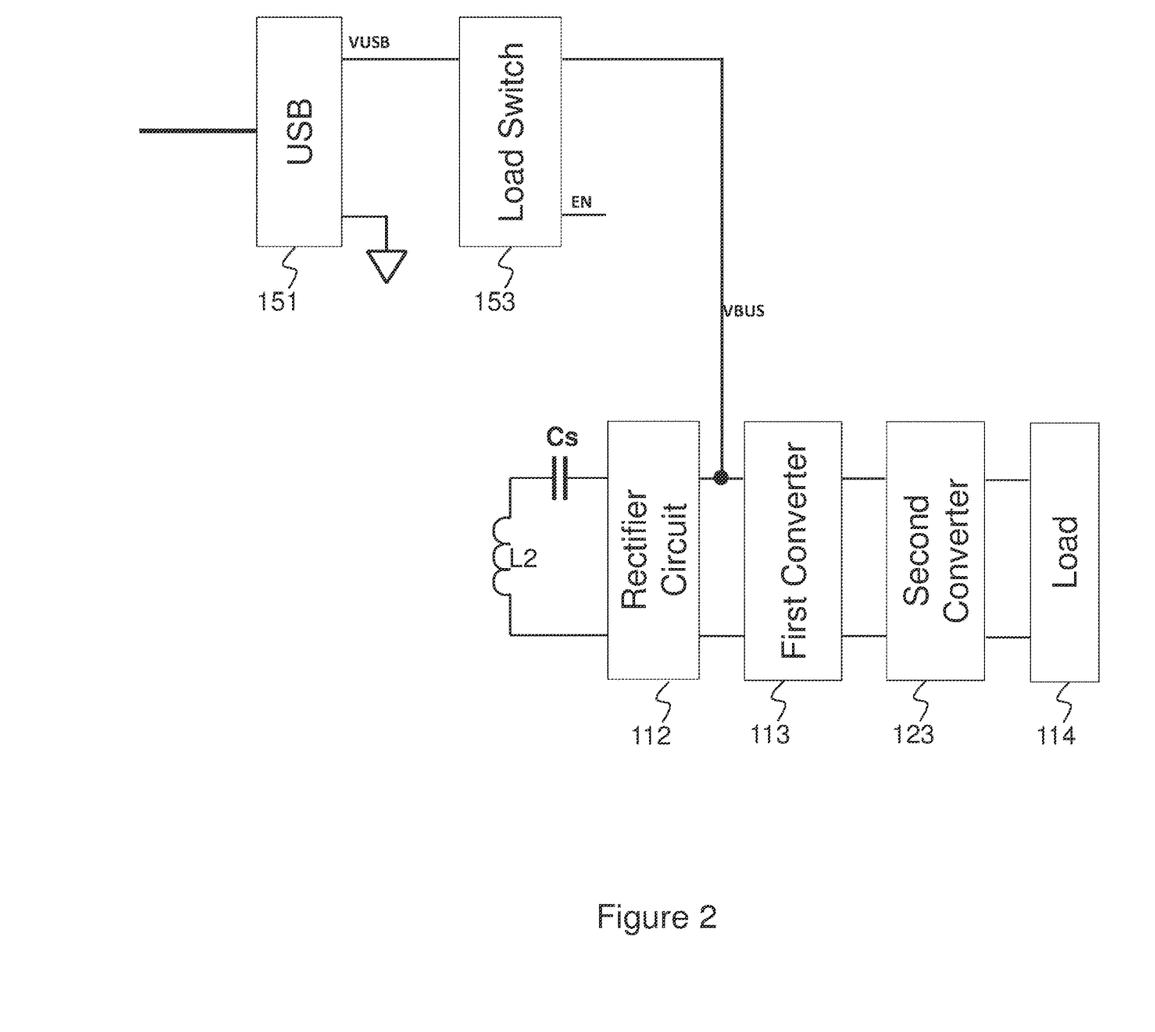
FIG. 2 illustrates a block diagram of a first implementation of the hybrid charging system shown in FIG. 1 in accordance with various embodiments of the present disclosure.

FIG. 2 illustrates a block diagram of a first implementation of the hybrid charging system shown in FIG. 1 in accordance with various embodiments of the present disclosure. The hybrid charging system 100 is configured to receive power from two different sources. When the hybrid charging system is configured to operate in a wireless charging mode, the load switch apparatus 153 is open and the load 114 is charged by the power generated by the receiver coil L2. In particular, the power generated by the receiver coil L2 is applied to the load 114 through the rectifier circuit 112, the first power converter 113 and the second power converter 123 as shown in FIG. 2. When the hybrid charging system 100 is configured to operate in a wired charging mode, the load switch apparatus 153 is closed and the load 114 is charged by the power from the USB port 151. In particular, the power from the USB port 151 is applied to the load 114 through load switch apparatus 153, the first power converter 113 and the second power converter 123 as shown in FIG. 2.

It should be noted that a voltage bus VBUS is a common node for both the power from the USB port 151 and the power from the receiver coil L2. The common node (voltage bus VBUS) shown in FIG. 2 is merely an example. Depending on different applications and design needs, the location of the common node (voltage bus VBUS) may vary accordingly. For example, the output of the load switch apparatus 153 may be connected to the output of the first power converter 113.

Figure 3:
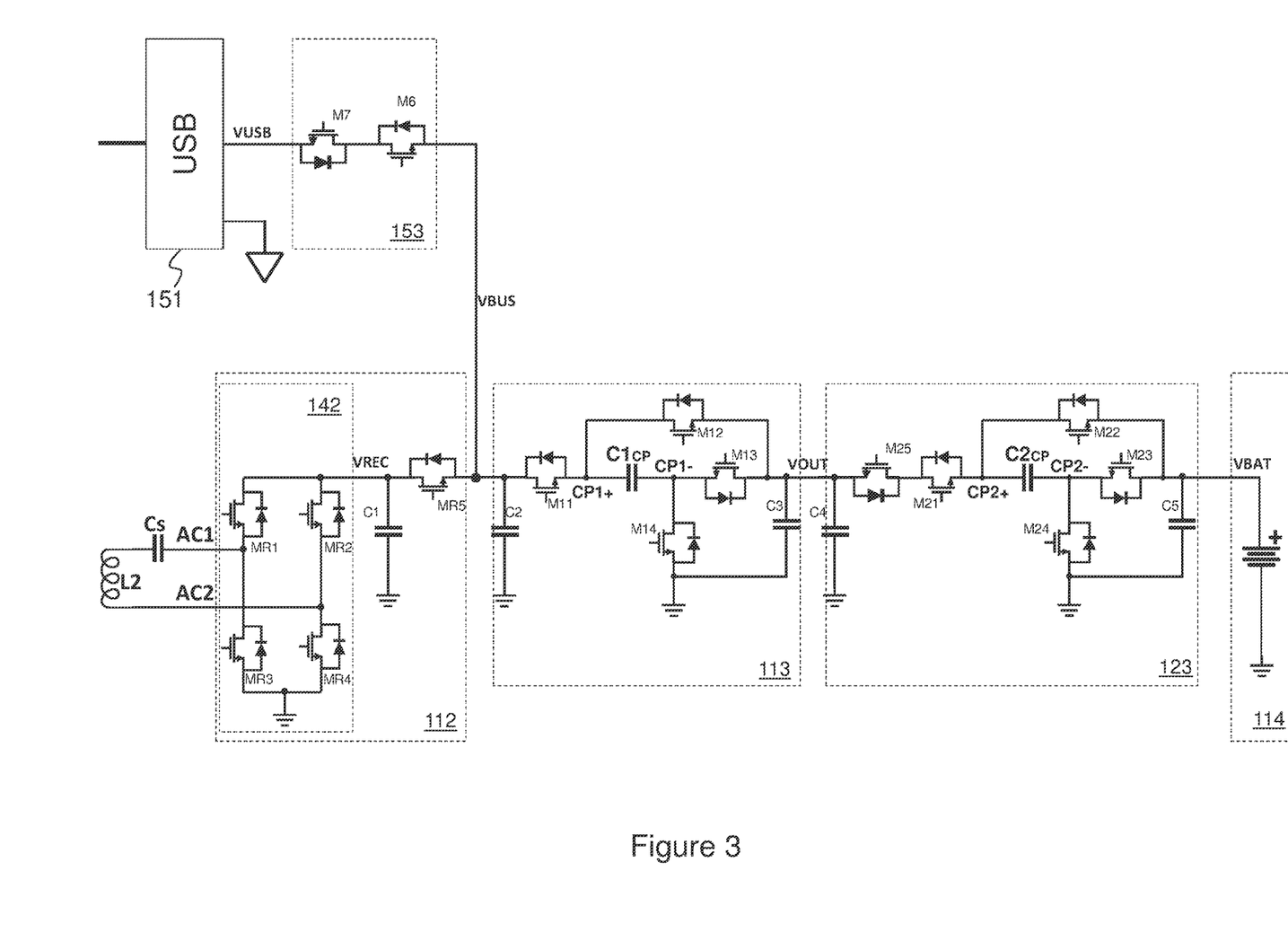
FIG. 3 illustrates a schematic diagram of a first implementation of the hybrid charging system shown in FIG. 2 in accordance with various embodiments of the present disclosure.

FIG. 3 illustrates a schematic diagram of a first implementation of the hybrid charging system shown in FIG. 2 in accordance with various embodiments of the present disclosure. The wireless power transfer path comprises the receiver coil L2, the receiver resonant capacitor Cs, the rectifier circuit 112, the first power converter 113 and the second power converter 123. As shown in FIG. 3, the receiver resonant capacitor Cs, the rectifier circuit 112 and the first power converter 113 and the second power converter 123 are connected in cascade between the receiver coil L2 and the load 114. In some embodiments, the load 114 is a rechargeable battery. Throughout the description, the load 114 may be alternatively referred to as a battery.

The rectifier circuit 112 comprises a rectifier 142, an output capacitor C1 and a switch MR5. In some embodiments, the rectifier 142 is implemented as a full-wave rectifier. The rectifier 142 includes four switching elements, namely MR1, MR2, MR3 and MR4. As shown in FIG. 3, the switching elements MR1 and MR3 are connected in series between the output terminal of the rectifier 142 and ground. Likewise, the switching elements MR2 and MR4 are connected in series between the output terminal of the rectifier 142 and ground. As shown in FIG. 3, the common node AC1 of the switching elements MR1 and MR3 is coupled to a first input terminal of the receiver coil L2 through the receiver resonant capacitor Cs. The common node AC2 of the switching elements MR2 and MR4 is coupled to a second input terminal of the receiver coil L2.

The output capacitor C1 is connected between the common node of MR1 and MR2, and ground. The capacitor C1 is employed to attenuate noise and provide a steady output voltage at the output of the rectifier 142.

The switch MR5 is connected between the common node of MR1 and MR2, and the voltage bus VBUS. In some embodiments, the switch MR5 is implemented as a MOSFET. As shown in FIG. 3, the drain of MR5 is connected to the common node of MR1 and MR2. The source of MR5 is connected to the voltage bus VBUS.

In some embodiments, the switch MR5 may function as a load switch. Alternatively, the switch MR5 may function as a linear regulator. In operation, when the hybrid charging system 100 is configured to operate in the wired charging mode, the load 114 receives the dc power from the USB port 151. In the wired charging mode, the switch MR5 is turned off. The turned-off switch MR5 prevents the power generated by the receiver coil L2 from charging the load 114. When the hybrid charging system 100 is configured to operate in the wireless charging mode, the load 114 receives the dc power from the receiver coil L2. In the wireless charging mode, the switch MR5 is turned on. The turned-on switch MR5 provides a conductive path for delivering the power generated by the receiver coil L2 to the load 114.

In the wireless charging mode, the switch MR5 may function as a linear regulator. In some embodiments, the output voltage of the hybrid charging system 100 is regulated trough adjusting the operating parameters of the transmitter circuit (e.g., switching frequency, duty cycle, phase shift of the transmitter circuit). During a load transient (e.g., from a heavy load to a light load), the voltage at the output of the rectifier 142 may be higher than the predetermined voltage (e.g., four times of VBAT). In order to regulate the output voltage of the hybrid charging system 100, the switch MR5 may be configured to operate as a linear regulator. More particularly, the gate drive voltage of the switch MR5 is reduced. As a result, the voltage at VBUS is reduced accordingly. In some embodiments, the controller of the hybrid charging system 100 keeps reducing the gate drive voltage of the switch MR5 until the bus voltage VBUS is equal to four times of VBAT.

It should be noted that the switch MR5 may be an optional component in some embodiments. For example, in some embodiments, an out-band communication control scheme is employed to better control the output voltage the hybrid charging system 100. In particular, the out-band communication control scheme helps to achieve a fast control loop. As a result, the output voltage of the hybrid charging system 100 is regulated by the fast control loop. It is not necessary to use the switch MR5 to control the output voltage. As such, the switch MR5 becomes an optional component.

According to some embodiments, the switching elements MR1, MR2, MR3, MR4 and MR5 are implemented as MOSFET or MOSFETs connected in parallel, any combinations thereof and/or the like. According to alternative embodiments, the switching elements (e.g., switch MR1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-wave rectifier (e.g., full-wave rectifier circuit 112 shown in FIG. 3), the implementation of the power receiver 120 shown in FIG. 3 may have many variations, alternatives, and modifications. For example, half-wave rectifiers may be alternatively employed.

In sum, the full-wave rectifier circuit 112 illustrated herein is limited solely for the purpose of clearly illustrating the inventive aspects of the various embodiments. The present disclosure is not limited to any particular power topology.

It should further be noted that while FIG. 3 illustrates five switches MR1-MR5, various embodiments of the present disclosure may include other variations, modifications and alternatives. For example, additional switching elements may be connected in parallel with each switch of the full-wave rectifier circuit 112. The additional switching elements help to improve the efficiency of the rectifier circuit 112.

It should further be noted the rectifier structure shown in FIG. 3 is merely an example. One person skilled in the art will recognize many alternatives, variations and modification. For example, the four switches MR1, MR2, MR3 and MR4 may be replaced by four diodes.

The first power converter 113 and the second power converter 123 are connected in cascade as shown in FIG. 3. Both the first power converter 113 and the second power converter 123 are implemented as charge pump power converters. As shown in FIG. 3, the first power converter 113 comprises an input capacitor C2, an output capacitor C3, a charge pump capacitor $C1_{CP}$ and a plurality of switches M11-M14. The second power converter 123 comprises an input capacitor C4, an output capacitor C5, a charge pump capacitor $C2_{CP}$ and a plurality of switches M21-M24. In addition, the second power converter 123 comprises a switch M25 connected between the output of the first power converter 113 and the switch M21. In some embodiments, the switch M25 may function as a load switch. In alternative embodiments, the switch M25 may function as a linear regulator for better controlling the output voltage of the second power converter 123. Since the first power converter 113 and the second power converter 123 share the same power topology, only the first power converter 113 is discussed below in detail to avoid repetition.

In some embodiments, the first power converter 113 is implemented as a charge pump power converter as shown in FIG. 3. The charge pump power converter operates in two different phases. During the first phase of the charge pump mode, switches M11 and M13 are turned on, and switches M12 and M14 are turned off. Since switches M11 and M13 are turned on, a first conductive path is established between VBUS and VOUT. The first conductive path is formed by switch M11, the charge pump capacitor $C1_{CP}$ and switch M13. The current flows from VBUS to VOUT through the first conductive path. During the first phase of the charge pump mode, the charge pump capacitor $C1_{CP}$ is charged and energy is stored in the charge pump capacitor $C1_{CP}$ accordingly.

During the second phase of the charge pump mode, switches M11 and M13 are turned off, and switches M12 and M14 are turned on. Since switches M12 and M14 are turned on, a second conductive path is established. The second conductive path is formed by switch M14, the charge pump capacitor $C1_{CP}$ and switch M12. During the second phase of the charge pump mode, the current discharges the charge pump capacitor $C1_{CP}$ and the energy stored in the charge pump capacitor $C1_{CP}$ decreases accordingly.

In operation, in order to improve the EMI performance of the hybrid charging system 100, the leading edge of the gate drive signal of the switch M11 is aligned with the leading edge of the gate drive signal of the switch M21. Such an alignment between the gate drive signal of the first power converter 113 and the second power converter 123 helps to improve the EMI performance of the hybrid charging system 100.

The load switch apparatus 153 comprises switches M6 and M7. As shown in FIG. 3, switches M6 and M7 are back-to-back connected to each other. The back-to-back connected M6 and M7 form an isolation switch.

In operation, when the hybrid charging system 100 is configured to operate in the wired charging mode, M6 and M7 are turned on. MR5, MR1 and MR2 are turned off. On the other hand, when the hybrid charging system 100 is configured to operate in the wireless charging mode, M6 and M7 are turned off. MR5 is turned on.

Figure 4:
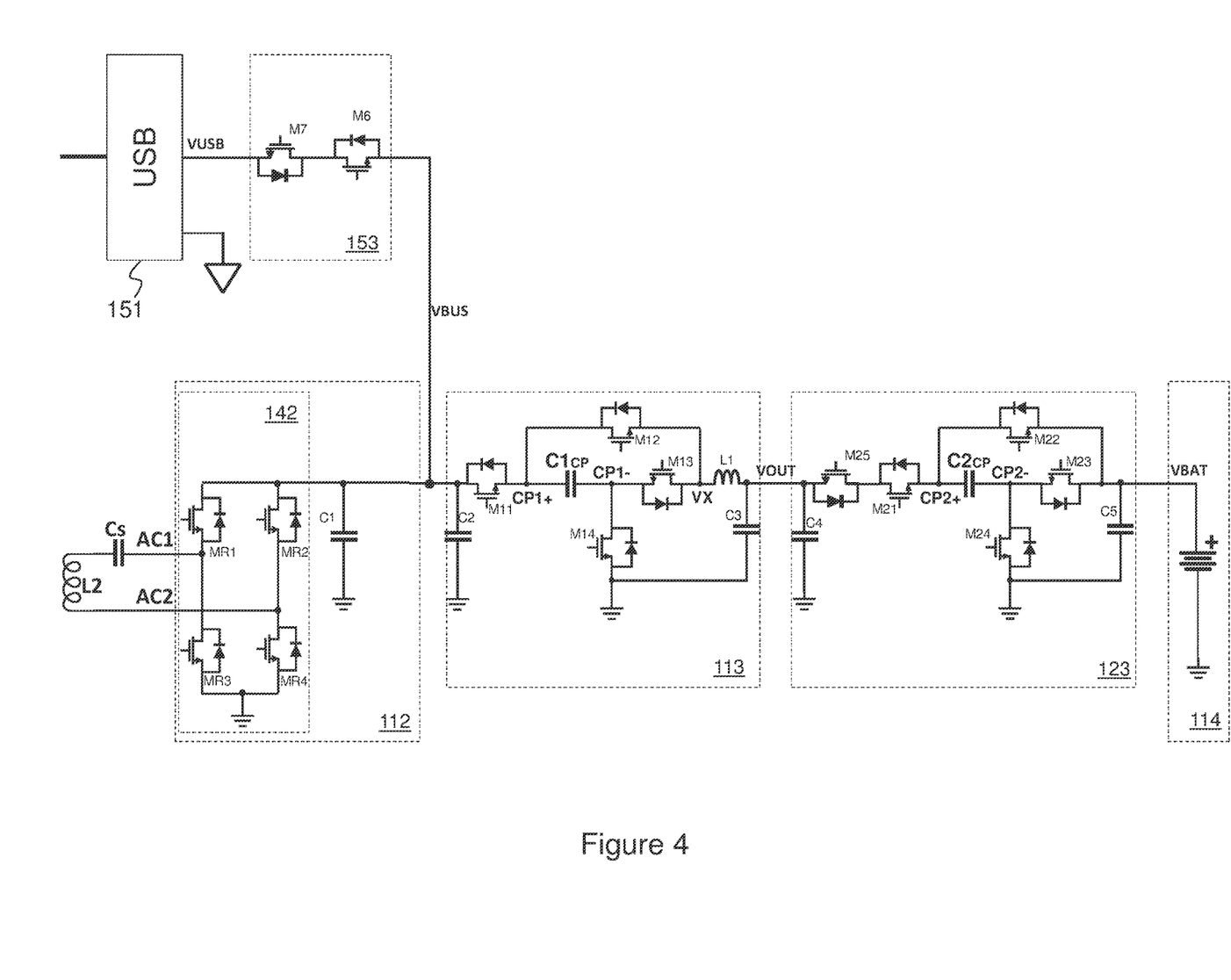
FIG. 4 illustrates a schematic diagram of a second implementation of the hybrid charging system shown in FIG. 2 in accordance with various embodiments of the present disclosure.

FIG. 4 illustrates a schematic diagram of a second implementation of the hybrid charging system shown in FIG. 2 in accordance with various embodiments of the present disclosure. The hybrid charging system shown in FIG. 4 is similar to that shown in FIG. 3 except that the first power converter 113 is implemented as a hybrid converter and the switch MR5 has been removed from the rectifier circuit 112. Throughout the description, the first power converter 113 is alternatively referred to as the hybrid converter 113.

As shown in FIG. 4, the hybrid converter 113 comprises switches M11-M14, a capacitor $C1_{CP}$, an output inductor L1 and an output capacitor C3. As shown in FIG. 4, the output inductor L1 and the output capacitor C3 form an output filter. The switch M11, the capacitor $C1_{CP}$ and the switch M13 are connected in series between VBUS and the output filter. A common node of the switch M11 and the capacitor $C1_{CP}$ is denoted as CP1+ as shown in FIG. 4. Likewise, a common node of the switch M13 and the capacitor $C1_{CP}$ is denoted as CP1−. A common node of the switch M13 and the output filter is denoted as VX. As shown in FIG. 4, the switch M12 is connected between CP1+ and VX. The switch M14 is connected between CP1− and ground.

In some embodiments, the capacitor $C1_{CP}$ functions as a charge pump capacitor. Throughout the description, the capacitor $C1_{CP}$ is alternatively referred to as the charge pump capacitor $C1_{CP}$.

The hybrid converter 113 may operate in three different operating modes, namely a hybrid mode, a charge pump mode and a buck mode. In the hybrid mode, the hybrid converter 113 operates in four different phases. In each phase, the current flowing through the output inductor L1 may ramp up or down depending on different combinations of the input voltage VBUS, the voltage across the charge pump capacitor $C1_{CP}$ and the output voltage VOUT. In the hybrid mode, the voltage of the hybrid converter 113 can be regulated to a predetermined voltage. Since the hybrid converter 113 under the hybrid mode has tight voltage regulation, the output voltage of the hybrid charging system 100 may be regulated through regulating the output voltage of the hybrid converter 113.

In the charge pump mode, the hybrid converter 113 operates in two different phases. In the charge pump mode, the hybrid converter 113 functions as a charge pump converter, which has been described in detail above, and hence is not discussed herein again.

In the buck mode, the hybrid converter 113 operates in two different phases. The switch M12 and the switch M13 are always-on. As a result, the charge pump capacitor $C1_{CP}$ is shorted and is not part of the operation of the buck mode. In each phase, the current flowing through the output inductor L1 may ramp up or down depending on different combinations of the input voltage VBUS and the output voltage VOUT. Furthermore, in order to have a smooth transition between the buck mode and the charge pump mode, the hybrid converter 113 may operate in an auto mode. In the auto mode, the charge pump capacitor is floating when the buck mode is applicable to the hybrid converter 113.

In some embodiments, the first power converter 113 functions as a voltage regulator when the hybrid charging system 100 operates in the wireless charging mode. The first power converter 113 functions as a charge pump converter when the hybrid charging system operates in the wired charging mode. In other words, during the wired charging mode, the hybrid charging system relies on the adaptor to regulate the output voltage of the hybrid charging system.

Furthermore, during the light load, the transient response of the adaptor is not fast enough to regulate the output voltage of the hybrid charging system 100. The first power converter 113 may operate as a hybrid converter to regulate the output voltage of the hybrid charging system 100.

Figure 5:
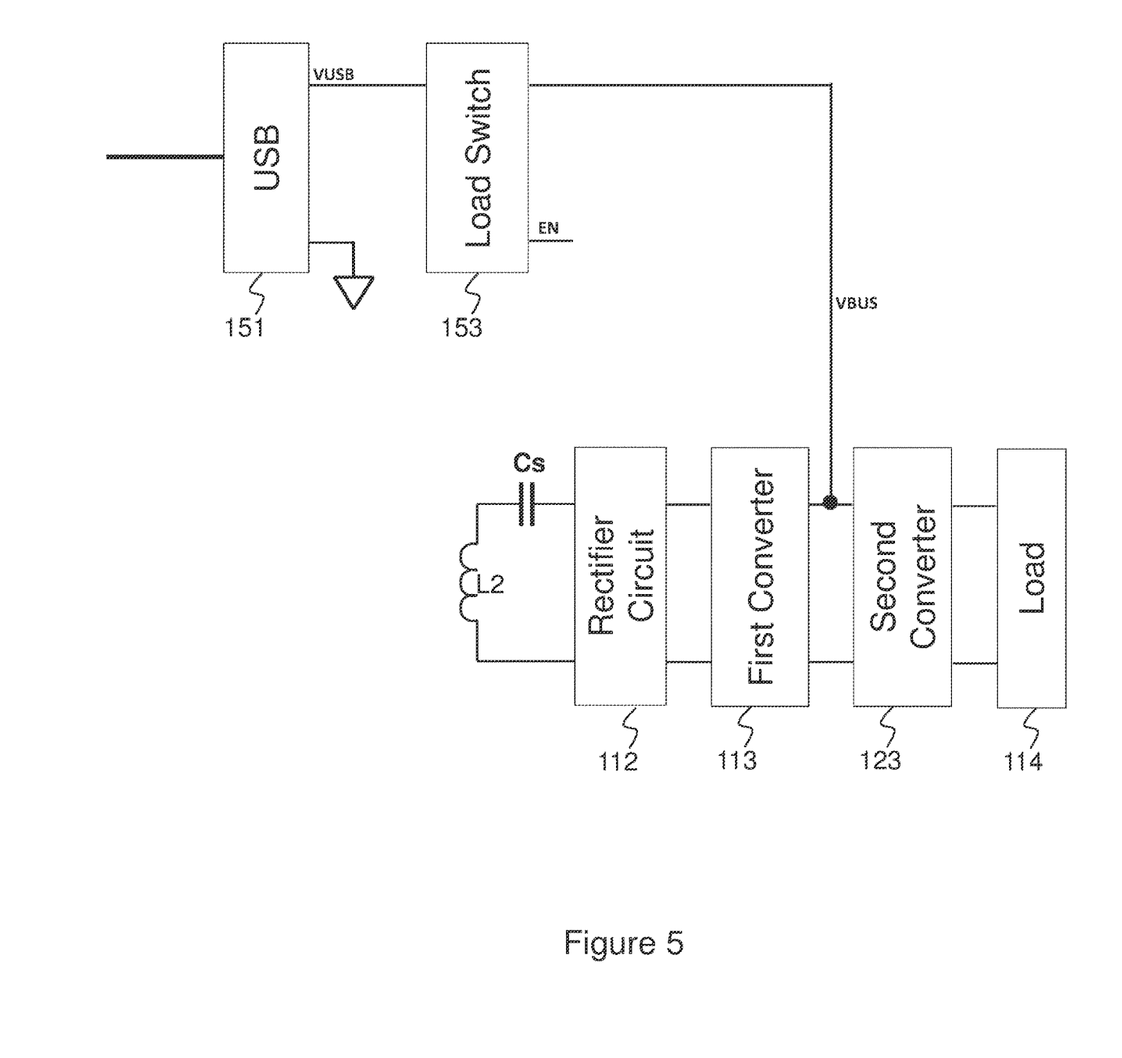
FIG. 5 illustrates a block diagram of a second implementation of the hybrid charging system shown in FIG. 1 in accordance with various embodiments of the present disclosure.

FIG. 5 illustrates a block diagram of a second implementation of the hybrid charging system shown in FIG. 1 in accordance with various embodiments of the present disclosure. The hybrid charging system shown in FIG. 5 is similar to that shown in FIG. 2 except that the voltage bus VBUS is at the output of the first power converter 113. As shown in FIG. 5, the wireless power transfer path comprises the rectifier circuit 112, the first power converter 113 and the second power converter 123. The wired power transfer path comprises the load switch apparatus 153 and the second power converter 123.

Figure 6:
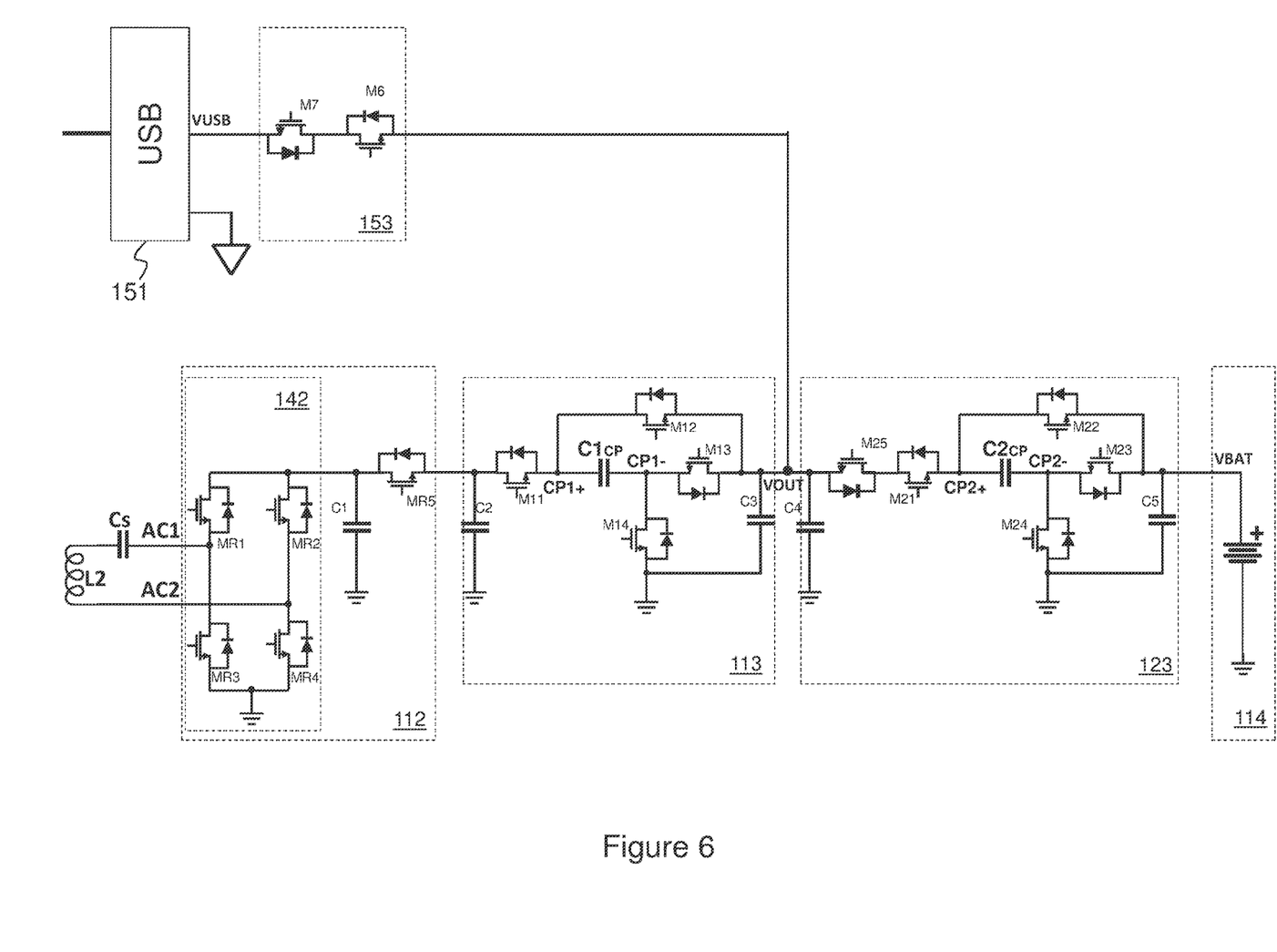
FIG. 6 illustrates a schematic diagram of a first implementation of the hybrid charging system shown in FIG. 5 in accordance with various embodiments of the present disclosure.

FIG. 6 illustrates a schematic diagram of a first implementation of the hybrid charging system shown in FIG. 5 in accordance with various embodiments of the present disclosure. The hybrid charging system shown in FIG. 6 is similar to that shown in FIG. 3 except that the voltage bus VBUS is at the output of the first power converter 113. The operation principle of the power converters 113 and 123 has been described above with respect to FIG. 3, and hence is not discussed again herein.

In operation, when the hybrid charging system 100 is configured to operate in the wired charging mode, M6 and M7 are turned on. MR5, MR1-MR4 and M11-M14 are turned off. On the other hand, when the hybrid charging system 100 is configured to operate in the wireless charging mode, M6 and M7 are turned off. MR5 is turned on.

Figure 7:
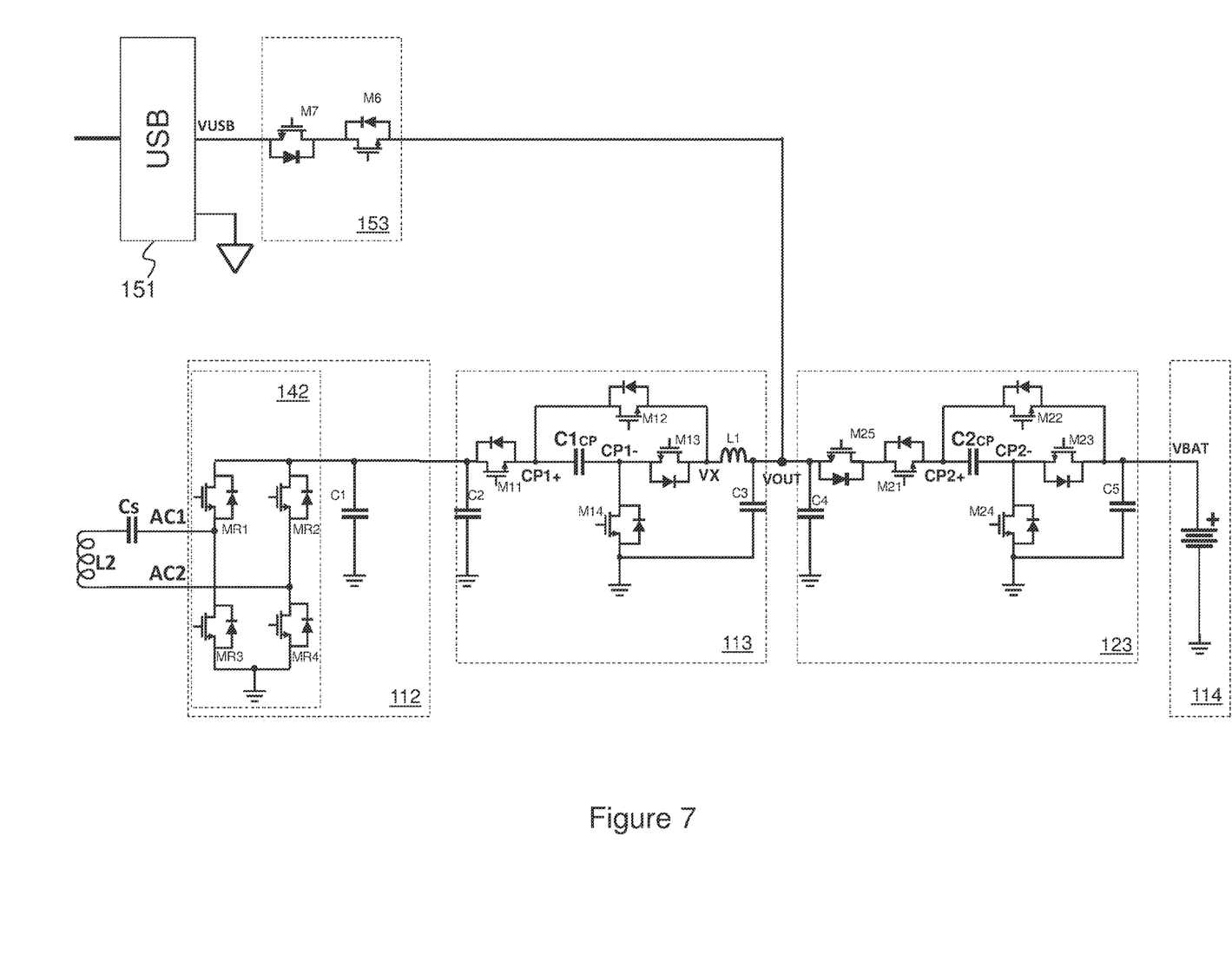
FIG. 7 illustrates a schematic diagram of a second implementation of the hybrid charging system shown in FIG. 5 in accordance with various embodiments of the present disclosure.

FIG. 7 illustrates a schematic diagram of a second implementation of the hybrid charging system shown in FIG. 5 in accordance with various embodiments of the present disclosure. The hybrid charging system shown in FIG. 7 is similar to that shown in FIG. 4 except that the voltage bus VBUS is at the output of the first power converter 113. The operation principle of the power converters 113 and 123 has been described above with respect to FIG. 4, and hence is not discussed again herein.

Figure 8:
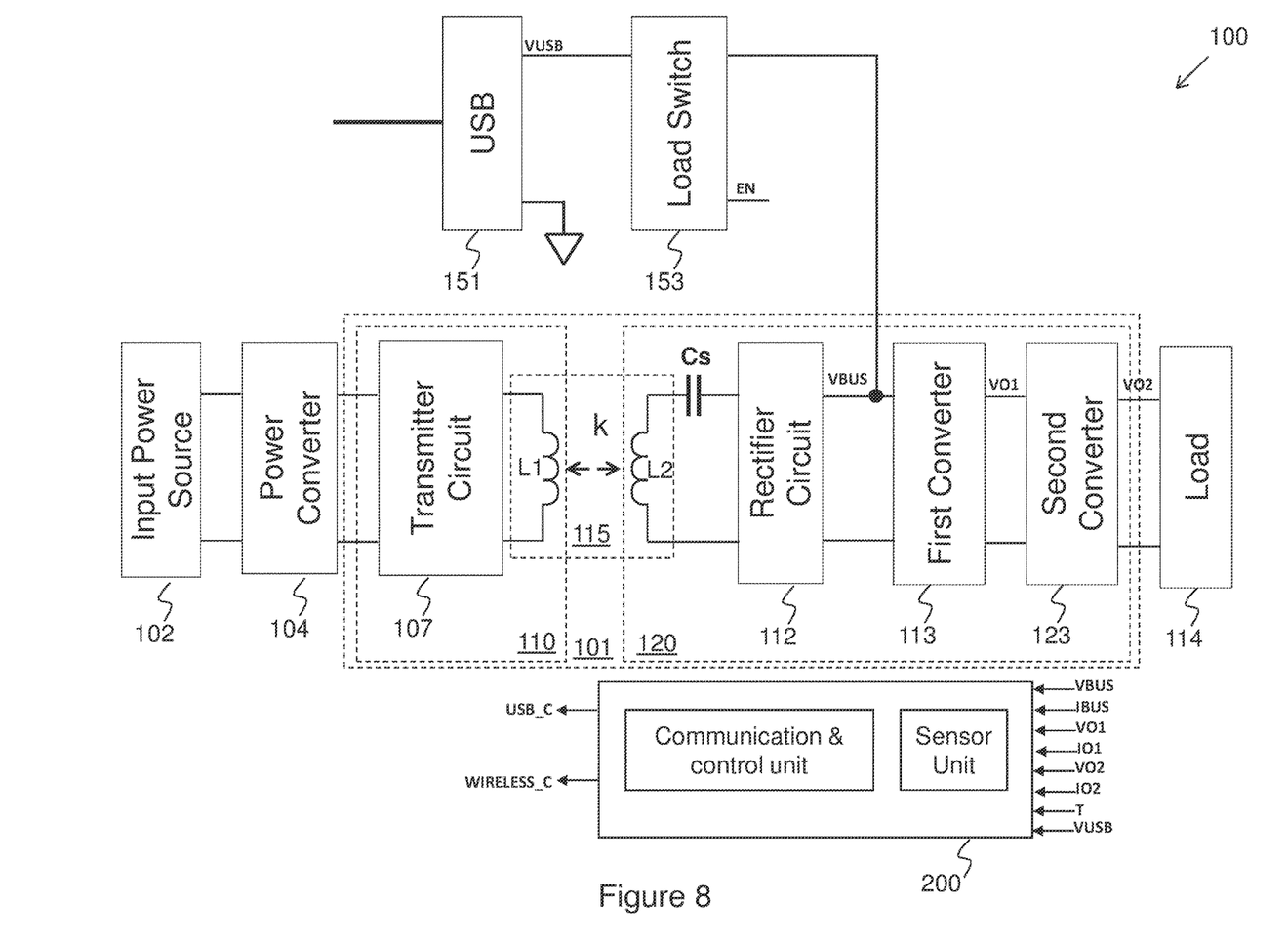
FIG. 8 illustrates a block diagram of a controller of the hybrid charging system in accordance with various embodiments of the present disclosure.

FIG. 8 illustrates a block diagram of a controller of the hybrid charging system in accordance with various embodiments of the present disclosure. A controller 200 may be used to control the operation of the hybrid charging system 100. The controller 200 may be a central processing unit (CPU) of a mobile device, an auxiliary controller of the mobile device, a microcontroller or any suitable control devices.

The controller 200 may comprises a sensing unit and a communication/control unit as shown in FIG. 8. The sensing unit is configured to receive a plurality of operating parameter such as the voltage of VBUS, the current flowing through VBUS, the output voltage of the first power converter 113, the current flowing through the output of the first power converter 113, the output voltage of the second power converter 123, the current flowing through the output of the second power converter 123, the output voltage of the USB port 151 (VUSB) and the operating temperature.

Based on the detected operating parameters, the controller 200 generates a first control signal for controlling the operation of the USB port 151 and a second control signal for controlling the operation the wireless power transfer path.

Figure 9:
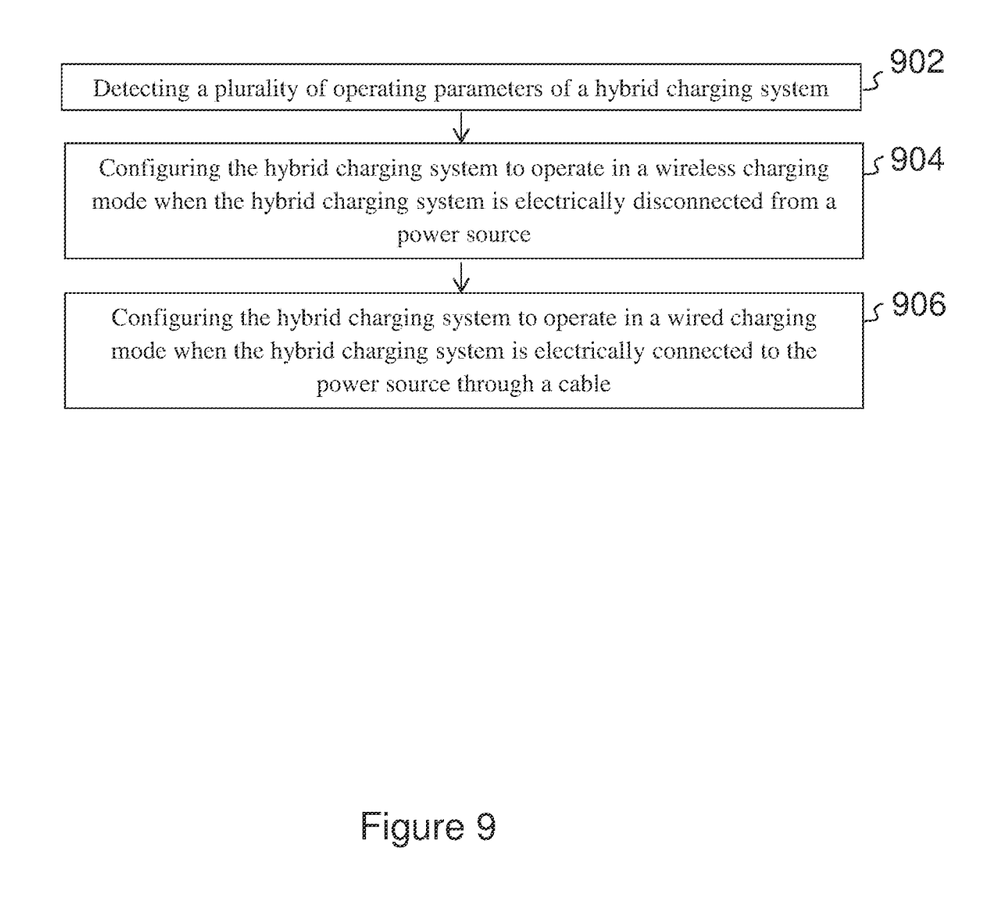
FIG. 9 illustrates a flow chart of applying a battery charging control mechanism to the hybrid charging system shown in FIG. 1 in accordance with various embodiments of the present disclosure.

FIG. 9 illustrates a flow chart of applying a battery charging control mechanism to the hybrid charging system shown in FIG. 1 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

Referring back to FIG. 1, the hybrid charging system comprises a rectifier circuit configured to convert an alternating current voltage into a direct current voltage, a load switch connected between and a voltage bus and a power port (e.g., USB port) configured to be connected to a power source (e.g., adaptor), and a first power converter and a second power converter connected in cascade between the rectifier circuit and a battery.

In some embodiments, the first power converter is a first charge pump power converter. The output voltage of the first charge pump power converter is equal to one half of an input voltage of the first charge pump power converter. The second power converter is a second charge pump power converter configured to function as a second voltage divider. The output voltage of the second charge pump power converter is equal to one half of an input voltage of the second charge pump power converter.

In alternative embodiments, the first power converter is a hybrid converter. The hybrid converter comprises a first switch, a capacitor and a second switch connected in series between an input voltage source and an output filter, a third switch connected between a common node of the first switch and the capacitor, and a common node of the second switch and the output filter and a fourth switch connected between a common node of the capacitor and the second switch, and ground. The second power converter is a charge pump power converter configured to function as a voltage divider At step 902, a plurality of operating parameters of the hybrid charging system is detected by a plurality of sensing devices. The operating parameters include the voltage at the voltage bus VBUS, the output voltage of the USB port, the system temperature, the output voltage of the first power converter, the output voltage of the second power converter, the current flowing through the first power converter, the current flowing through the second power converter, the current flowing through the voltage bus VBUS and the like. The detected operating parameters are processed by a controller.

At step 904, the hybrid charging system is configured to operate in a wireless charging mode to charge the battery after a power source (e.g., an adaptor connected to a USB port of the hybrid charging system through a cable) has been cut off from the hybrid charging system. Prior to the step of configuring the hybrid charging system to operate in the wireless charging mode, the controller executes the steps of detecting a voltage drop at the voltage bus (VBUS), comparing the voltage drop with a first predetermined threshold, turning off the load switch after the voltage drop is below the first predetermined threshold and turning on a switch connected between the rectifier and the voltage bus.

During the wireless charging mode, the hybrid charging system may regulate the output voltage of the hybrid charging system through adjusting operating parameters of a transmitter circuit coupled to the transmitter coil.

At step 906, the hybrid charging system is configured to operate in a wired charging mode to charge the battery after the power source (e.g., adaptor) has been connected to the hybrid charging system. Prior to the step of configuring the hybrid charging system to operate in the wired charging mode, the controller executes the steps of detecting a voltage at the power port (VUSB), comparing the voltage at the power port with a second predetermined threshold, turning off a switch connected between the rectifier and a voltage bus after the voltage at the power port is greater than the second predetermined threshold and after a predetermined delay, turning on the load switch connected between the power port and the voltage bus.

During the wired charging mode, the hybrid charging system may regulate the output voltage of the hybrid charging system through adjusting operating parameters of the power source (e.g., adaptor).

It should be noted that during either the wired charging mode or the wireless charging mode, the output voltage of the charger can be regulated through regulating the first power converter if the first power converter is implemented as a hybrid converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
configuring a high voltage charging system to operate in a wireless charging mode to charge a battery after a power source has been disconnected from the high voltage charging system, wherein the high voltage charging system comprises a rectifier, a first power converter, a second power converter connected in cascade, and a load switch connected between a voltage bus and a power port configured to be connected to the power source; and
configuring the high voltage charging system to operate in a wired charging mode to charge the battery after the power source has been connected to the high voltage charging system.

2. The method of claim 1, further comprising:
In a transition from the wireless charging mode to the wired charging mode, turning off a switch connected between the rectifier and the first power converter prior to turning on the load switch, wherein the voltage bus is at an input of the first power converter.

3. The method of claim 2, further comprising:
before having the transition from the wireless charging mode to the wired charging mode, detecting a voltage at the power port; and
leaving the wireless charging mode and entering into the wired charging mode after the voltage at the power port is greater than a first predetermined threshold.

4. The method of claim 1, further comprising:
In a transition from the wired charging mode to the wireless charging mode, turning off the load switch prior to turning on a switch connected between the rectifier and the first power converter, wherein the voltage bus is at an input of the first power converter.

5. The method of claim 4, further comprising:
before having the transition from the wired charging mode to the wireless charging mode, detecting a voltage at the voltage bus; and
determining whether the high voltage charging system leaves the wired charging mode and enters into the wireless charging mode based on a detected voltage at the voltage bus.

6. The method of claim 1, wherein:
the first power converter is a first charge pump power converter; and
the second power converter is a second charge pump power converter.

7. The method of claim 1, wherein:
the first power converter is a hybrid converter comprising:
a first switch, a capacitor and a second switch connected in series between an input terminal of the hybrid converter and an output filter;
a third switch connected between a common node of the first switch and the capacitor, and a common node of the second switch and the output filter; and
a fourth switch connected between a common node of the capacitor and the second switch, and ground; and
the second power converter is a charge pump power converter.

8. The method of claim 1, wherein:
the voltage bus is connected to a common node of the first power converter and the second power converter.

9. A method comprising:
configuring a high voltage charging system to leave a wired charging mode and enter into a wireless charging mode after a power source has been disconnected from the high voltage charging system, wherein:
the power source is coupled to a voltage bus of the high voltage charging system through a cable and a load switch; and
the high voltage charging system comprises a rectifier, a first power converter, a second power converter connected in cascade; and
configuring the high voltage charging system to leave the wireless charge mode and enter into the wired charging mode after the power source has been connected to the high voltage charging system.

10. The method of claim 9, wherein:
the voltage bus is at an input of the first power converter;
the first power converter is a first charge pump power converter;
the second power converter is a second charge pump power converter; and
a switch is connected between an output of the rectifier and the input of the first power converter.

11. The method of claim 10, further comprising:
configuring the high voltage charging system to leave the wireless charge mode and enter into the wired charging mode through turning off the switch prior to turning on the load switch.

12. The method of claim 10, further comprising:
configuring the high voltage charging system to leave the wired charging mode and enter into the wireless charging mode through turning off the load switch prior to turning on the switch.

13. The method of claim 9, wherein:
the voltage bus is at an input of the first power converter;
the first power converter is a hybrid converter;
the second power converter is a charge pump power converter; and
an output of the rectifier is directly connected to the input of the first power converter.

14. The method of claim 13, wherein the hybrid converter comprises:
a first switch, a capacitor and a second switch connected in series between an input terminal of the hybrid converter and an output filter;
a third switch connected between a common node of the first switch and the capacitor, and a common node of the second switch and the output filter; and
a fourth switch connected between a common node of the capacitor and the second switch, and ground.

15. The method of claim 9, wherein:
the voltage bus is at an output of the first power converter;
the first power converter is a first charge pump power converter;
the second power converter is a second charge pump power converter; and a switch is connected between an output of the rectifier and an input of the first power converter.

16. The method of claim 9, wherein:

the voltage bus is at an output of the first power converter;

the first power converter is a hybrid converter;

the second power converter is a charge pump power converter; and an output of the rectifier is directly connected to an input of the first power converter.

17. A method comprising:

configuring a high voltage charging system to have transitions between a wired charging mode and a wireless charging mode, wherein:

a power source is configured to be coupled to a voltage bus of the high voltage charging system through a cable and a load switch; and the high voltage charging system comprises a rectifier, a first power converter, a second power converter connected in cascade.

18. The method of claim 17, wherein:

configuring the high voltage charging system to leave the wired charging mode and enter into the wireless charging mode occurs after the power source has been disconnected from the high voltage charging system.

19. The method of claim 17, wherein:

configuring the high voltage charging system to leave the wireless charge mode and enter into the wired charging mode occurs after the power source has been connected to the high voltage charging system.

20. The method of claim 17, wherein:

the first power converter is a first charge pump power converter; and the second power converter is a second charge pump power converter.

* * * * *